UNITED STATES PATENT OFFICE.

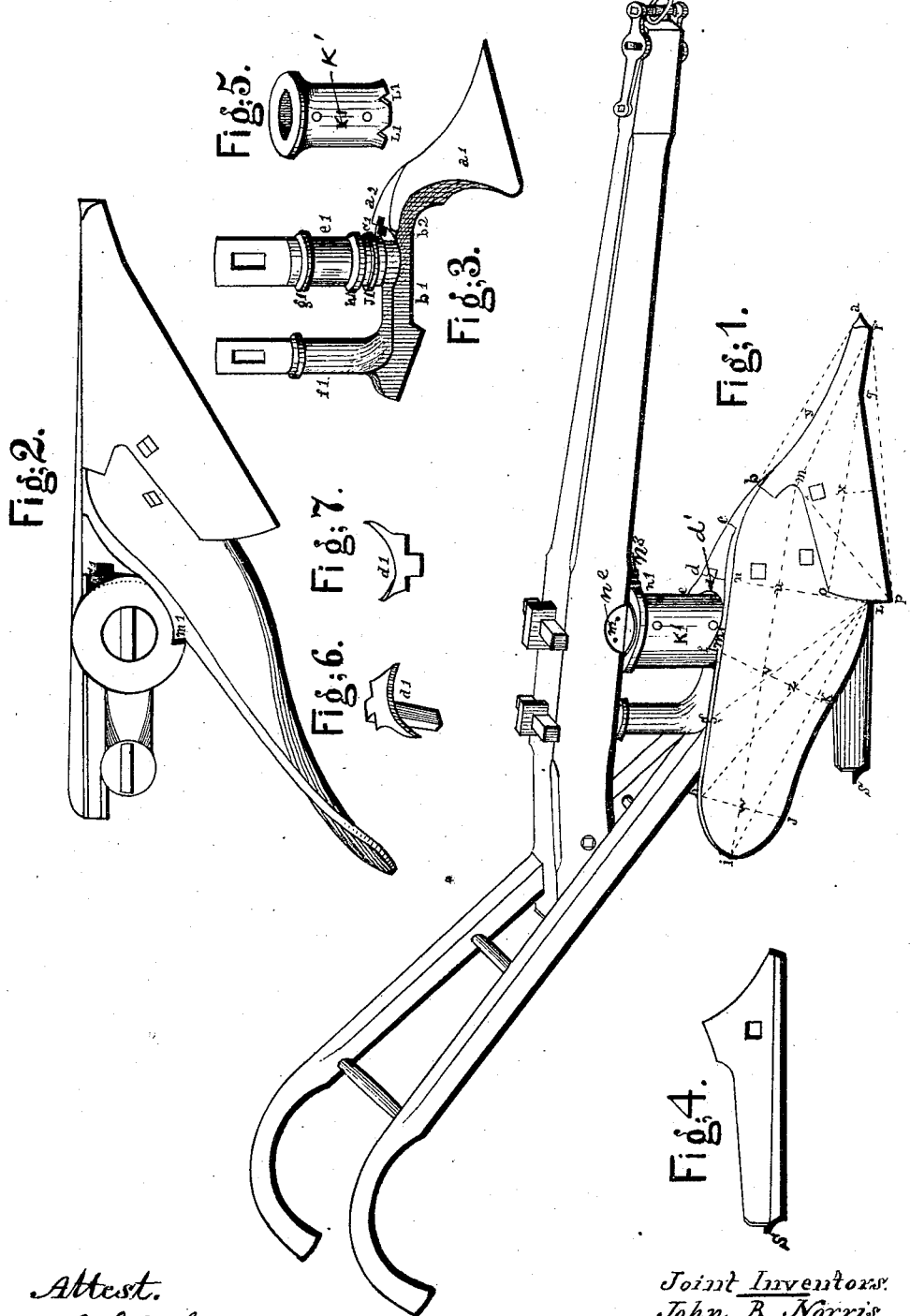

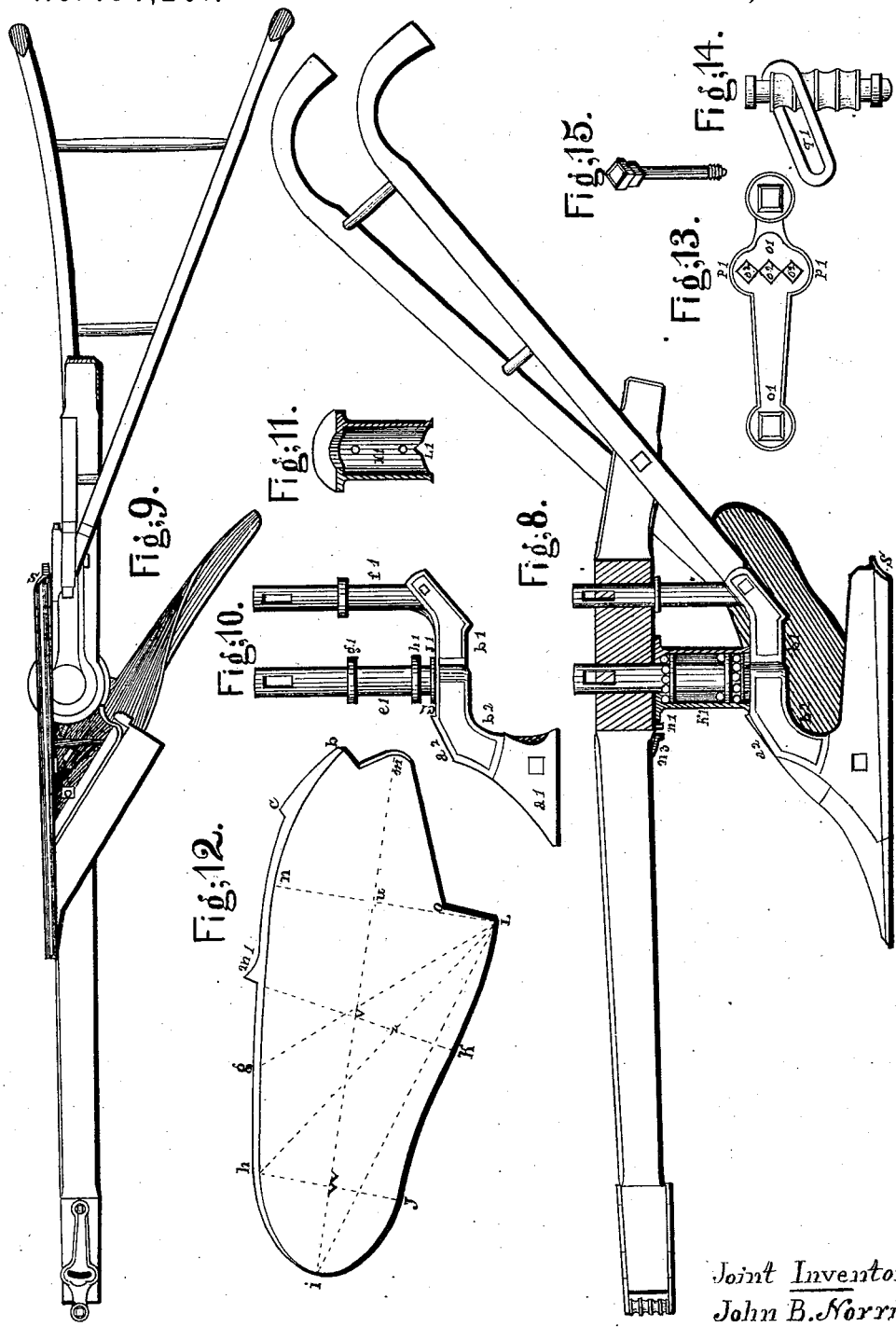

JOHN B. NORRIS, MARCUS M. BOWERS, AND WILLIAM C. DIMMOCK, OF RICHMOND, VIRGINIA.

IMPROVEMENT IN PLOWS.

Specification forming part of Letters Patent No. 164,201, dated June 8, 1875; application filed August 4, 1874.

*To all whom it may concern:*

Be it known that we, JOHN B. NORRIS, MARCUS M. BOWERS, and WILLIAM C. DIMMOCK, citizens of Richmond, county of Henrico and State of Virginia, have invented and made certain new and useful Improvements in Plows, said improvements being more intimately connected with Patent No. 145,120, granted, December 2, 1873, to John B. Norris.

The nature and principles of our improvements consist, first, in the construction of a part of the plow which we designate as a compound bracket and arm, which form the base or superstructure of the whole plow, said bracket being provided with a detachable breast-piece, all of which will be more fully set forth and explained hereinafter. Secondly, in an improved arrangement of anti-friction balls, together with the improved manner of suspending and employing a revolving cylinder, in combination with said balls. Thirdly, in fluting or grooving the under-side surface of the land-side strip and plowshare. Fourthly, in the employment of a fender-pin or a fender-plate, together with lateral shield-plates, in combination with the plow-beam and the revolving cylinder, all as hereinafter described, and represented in the accompanying drawings.

Figure 1 represents a perspective view of the right-hand side of the plow. Fig. 2 represents a top view of the plow without the beam and handles. Fig. 3 shows the bracket or superstructure detached from the other parts of the plow. Fig. 4 shows the form of the land-side detached. Fig. 5 shows the improved revolving cylinder detached. Figs. 6 and 7 show perspective and top views of the detachable breast-piece. Fig. 8 is a view of the left-hand side of the plow, with a vertical section showing the arrangement of the several series of anti-friction balls. Fig. 9 is a plan view of the plow inverted, to show the flutes or grooves. Fig. 10 is a vertical side view of the left-hand side of the bracket or superstructure. Fig. 11 shows a vertical section of the revolving cylinder. Fig. 12 shows the form of the mold-board. Figs. 13, 14, and 15 show the several parts of the swivel-roller clevis.

In mechanical agricultural science a leading and important branch is that of disintegrating compacted soil and adapting it to the desired purpose and uses of proper tillage and the requirements of the husbandman; consequently, from the earliest knowledge and most primitive use of the plow as an agricultural implement, the wants of the plowman have led him to try to embody into a tangible shape some contrivance or mechanical device tending to the accomplishment of the great desideratum, the economy and reduction of animal effort and manual labor, with perfected and profitable results; consequently, from time to time, necessity has suggested to inventive talent to produce, by some practical means, the benefits sought for. Hence, many alleged improvements in the operation of plowing have been made and have been used, or discarded as useless, according to the merits thereof, and, as far as general and extended experience are known, no device or contrivance heretofore used has been completely productive of the results sought for. But after a series of thorough mechanical and practically-tested experiments, it is believed we have attained, with our joint improvements, all the good and effectual practical results that can be reasonably desired.

All persons familiar with plowing are aware that it is not unfrequently the case where there is rank vegetable growth, or where the land has become foul by briers or long tangled undergrowth or rubbish, that the operation of plowing is more or less retarded by the accumulation or gathering of such matter, and, consequently, clogging of the plow, in the angle formed at the junction of the neck and beam of the plow, thus producing more or less resistance, and considerably retarding the plow as it moves in the furrowed soil, and from such a cause much inconvenience, considerable waste of time, and additional labor are encountered, as most persons experienced in farming also know.

In the construction of our plow we claim to have produced several material and important features of improvement on the original plow of John B. Norris, patented December 2, 1873.

The said improvements will be more clearly understood by a reference to the accompanying drawings, with the explanations thereof.

Our mold-board and share are formed of the shapes represented, presenting certain curves and concave surfaces that afford the least possible resistance and friction in the turning up of the soil, and, consequently, thus greatly reducing the draft, through all of which we are enabled to employ a two-horse plow, where, under ordinary circumstances, in the same soil, a large-size three-horse plow has been found necessary to produce the same result.

The diagrams represent the shape and construction, together with a general explanation of the dimensions, of a two-horse plow of our invention, which size, complete, weighs in full eighty pounds. The mold-board alone weighs fifteen pounds only. The whole length of the plow, from end of the beam to end of the left-hand handle, in a direct straight line above the beam, is seven feet two inches. The plow stands sixteen inches high from the bottom of the land-side to the under surface of the beam, upward in a vertical line. The length of the beam from the front end to the vertical center of the front stem is three feet five and one-half inches. The length from front end of the beam to the left-hand handle, at point of front where connected to butt end of the beam, is four feet five and one-half inches. The distance between the vertical center of the two stems or necks above the beam is six inches. The spread or distance between the back or heel end of the land-side and extreme end of the mold-board is fourteen inches.

*Measurements of the Mold-Board and Share, Fig. 1.*—The distance from $a$ to $b$ is eleven and one-fourth inches; from $b$ to $c$, three and one-half inches; from $c$ to $d$, three inches; from $d$ to $e$, two inches; from $e$ to $f$, four inches; from $f$ to $i$, around the curved edge, fifteen inches; from $i$ to L, in a straight line across, eighteen and one-half inches; from L to $p$, two and one-fourth inches; from $p$ to $q$, fourteen inches; from $q$ to $r$, two and one-half inches; from $r$ to $a$, one and one-half inch; from $o$ to $p$, four and one-half inches; from $p$ to $m$, nine and one-half inches; from $o$ to $m$, six and three-fourths inches; from $o$ to $n$, eight and one-half inches; the depth of the concavity at $x$, from $o$ to $r$, one-half inch; depth of concavity at $y$, seven-eighths of an inch; the depth of angle $q$, from $p$ to $r$, one inch; length from $m$ to $i$, twenty-two and three-fourths inches; depth of concavity at $w$, seven-eighths of an inch; at V, one and one-eighth of an inch; at W, five-eighths of an inch, all taken in a straight line across from $m$ to $i$. Length from $f$ to $k$, nine and one-half inches. Length from $h$ to J, six and one-half inches. The thickness across the breast from $d$ to $n$, two and three-fourths inches, including thickness of mold-board. Distance from $g$ to L, twelve and one-fourth inches. Distance from $h$ to L, sixteen inches; the concavity from $h$ to L, at $z$, two inches.

From the foregoing measurements, the correct dimensions and form of our mold-board will be readily and accurately obtained.

In the accompanying drawings, Figs. 3, 8, and 10 show vertical right and left hand side views of the compound bracket $a^1$ and arm $b^1$. In the patent referred to, the shape of the bracket is more curved on the upper surface, with a shorter and more of a circular-arched arm, while our improved bracket has an inclined breast, as at $a^2$, Figs. 3, 8, 10, together with a more elongated or elliptical-arched arm, $b^2$. By this shape we are enabled to form a mortise and seat, $c'$, Figs. 2, 3, 10, vertically through the breast of the bracket to accommodate a detachable breast-piece, $d'$, Figs. 1, 6, 7, the object and utility of which will be hereinafter explained.

Attached to and extending vertically upward from the top of the bracket and arm are the front and back neck or stems $e'$ $f'$, the front neck or stem $e'$ being provided with three annular collars or rings, $g'$ $h'$ $j'$, Figs. 3, 10. Said collars must be formed wide enough across their annular plane to hold small metal balls or spheres, as shown by the series of small circles in Fig. 8. Said balls are used as anti-friction surfaces. The collars or rings may all be made and fitted to work neatly, or be movable around the neck or stem $e'$, so as to create as little friction as possible.

In combination with said rings and anti-friction balls we employ a revolving cylinder, $k'$, Fig. 1, formed with nicks or notches L' L', as shown in Figs. 5, 11.

In Figs. 1, 2, and 12, the mold-board of our plow is shown formed with an offset or spur-like projection, $m'$, which is designed to bring the upper edge or line of the mold-board closer to and around the lower edge of the revolving cylinder, so as to leave no angle or space for the lodgment and accumulation of matter, which would clog and prevent the free movement of the cylinder.

The object of grooving the under-side surface of the land-side strip and plow-point, Figs. 1, 4, 8, 9, at S, is not only to increase the strength thereof, but also to get a larger chill-surface, to give greater durability; besides, the groove causes the plow to enter the soil more readily, guiding it more directly without jumping when entering strong ground.

In the original patent of John B. Norris, referred to, one set of anti-friction balls only are employed, and all the rings or collars around the neck or stem are permanently or rigidly fixed. The revolving cylinder is fitted immediately over and rests on the top of the upper ring or collar, while the lower edge of the cylinder rests immediately down in contact with the bracket; but, as will be seen in Fig. 8 of our drawings, we employ several series of anti-friction balls, each ring or collar being provided with a set of balls. Furthermore, we suspend on the top series of balls the cylinder $l'$, by which means the lower edge of the cylinder is kept off, or relieved from bearing or rubbing against the top of the bracket, thus enabling the cylinder to rotate or move smoothly, freely, and readily to perform its required office. The largest size friction-balls used by us for the purpose required is three-eighths of an inch in diameter.

In Figs. 1 and 8 are shown a little fender-plate, $n^3$, attached onto the under side of the beam, and a pin, $n^1$, inserted into the beam immediately in front of the revolving cylinder, and on the sides of the beam immediately above the cylinder are attached small shield-plates $n^2$, Fig. 1, the object of said devices being to prevent any matter working in under the beam between the cap of the revolving cylinder.

In Figs. 13 and 14 is shown, detached from the plow-beam, our clevis having the surface paneled out or sunk at $o^1$ $o^1$, the object of which is to have the heads of the several confining-bolts somewhat below the surfaces, so as to prevent getting loose by coming in contact with any obstruction. Within the paneled space, at the broadest part $p'$ $p'$, one or more square mortises, $o^2$ $o^2$ $o^2$, are shown, the angles of each square opening into each other, a square-necked linchpin or bolt, Fig. 15, being employed when required, said pin being formed with a round body or shank, and provided with a screw-thread and nut at the smaller end. In using this square neck-pin, which conforms in shape in shape to the square mortise of the clevis, there is less liability to get loose or work out of its place should the nut on round end work loose or drop off. The several square mortises enable the adjustment of the clevis right or left. By using the square neck-pin all lateral or irregular play of the clevis is prevented.

Fig. 14 shows a grooved or fluted swivel-roller, which is perforated with a smooth round bore. This roller is to receive a round bolt formed with a square head and screw-nut in one end, as shown in Fig. 15. These several parts, when put together, form the clevis complete with the hitching-link $r'$, as shown in Figs. 1, 14.

In the operation of plowing with our improved plow, besides having a very light draft, affording very little resistance to the surface of the mold-board, any obstruction or clogging of the plow by rank growth or accumulation of rubbish is prevented, for as the revolving cylinder is suspended on anti-friction balls and the inner hollow circumference is in contact with movable anti-friction balls, the slightest rubbish matter coming against the outer surface rotates the cylinder either to the right or left, thus readily casting aside and preventing all obstruction to the plow while being moved forward.

On the upper line or edge of the mold-board is the spur-projection $m'$ rising above the lower edge of the revolving cylinder. This spur-projection acts as a stationary scraper, so as to keep the cylinder clean and free from any compacting earthy matter that might accumulate from the loose earth of the furrow. Then again the notches or nicks L' formed in the lower edge of the cylinder also act as revolving scrapers, to cast out any small particles of earth that might work in between the cylinder and the breast-piece $d'$, said breast-piece being made detachable, in order to be removed when desired, so as to clean away any particles of earth or other obstruction that might work around the cylinder.

The two small circles or dots on the circumference of the cylinder indicate suitable openings or inlets, through which the small anti-friction balls are inserted within the interior of the cylinder. After having supplied a sufficient number of balls, the openings are to be plugged or closed up.

Having described the nature, form, construction, and operation of our joint improvements, and having shown the same by correct drawings, and disclaiming the invention and use of a single group of anti-friction balls, and a cylinder and plow bracket, such as described, constructed, and shown in the original Patent of John B. Norris, No. 145,120, dated December 2, 1873, what we do claim as new, and of our joint invention, is—

1. The neck or stem of a plow, with movable and fixed annular collars or rings forming ledges around the neck or stem, each of said ledges being provided with a suitable number of anti-friction balls combined with a revolving cylinder or collar suspended over and resting upon the top series or group of balls, as shown in Fig. 8, substantially as and for the purpose described.

2. The revolving cylinder or collar of a plow formed with one or more nicks or notches, L' L', as shown in Figs. 5, 11, for the purpose substantially as set forth and described.

3. A plow-base or pedestal-bracket formed with an inclined or an oval breast, $a^2$, and an elliptical or elongated arched arm, $b^1 b^2$, formed with a mortise through the breast part thereof, and provided with a detachable breast-piece, $d'$, substantially as shown and described, for the purposes set forth.

4. The mold-board formed with the spur-like projection or scraper $m'$, in combination with the revolving cylinder $k'$, Figs. 1, 2, 12, substantially as shown and described.

5. A land-side strip and share of a plow, fluted or grooved on the under side, as shown at S, Figs. 1, 4, 8, 9, substantially as set forth and described.

6. The fender-pin $n^1$, the fender-plate $n^3$, and the lateral shield-plates $n^2$, combined with the plow-beam, and the revolving cylinder or collar $k'$, Figs. 1, 8, as shown and for the purposes substantially as set forth and described.

JOHN B. $\overset{\text{his}}{\times}$ NORRIS.
$\quad\quad\quad$ mark.
MARCUS M. BOWERS.
WILLIAM C. DIMMOCK.

Witnesses:
A. B. WILLIAMS,
ANDREW BRIGGS,
P. WEISIGER.